United States Patent Office.

ADOLF BAEYER AND VIGGO B. DREWSEN, OF MUNICH, BAVARIA, ASSIGNORS TO BADISCHE ANILIN AND SODA FABRIK, OF MANNHEIM, GERMANY.

MANUFACTURE OF ARTIFICIAL INDIGO.

SPECIFICATION forming part of Letters Patent No. 257,814, dated May 9, 1882.

Application filed April 14, 1882. (No specimens.)

*To all whom it may concern:*

Be it known that we, ADOLF BAEYER, a subject of the King of Bavaria, and VIGGO BEUTNER DREWSEN, a subject of the King of Sweden and Norway, both residing at Munich, in the Kingdom of Bavaria, Empire of Germany, have invented new and useful Improvements in the Manufacture of Artificial Indigo, of which the following is a specification.

This invention relates to the production of an artificial indigo from orthonitrobenzaldehyde.

In carrying out this invention we proceed as follows: We take about ten parts, by weight, of orthonitrobenzaldehyde and dissolve the same in about fifteen parts, by weight, of acetone. We then gradually mix the solution thus obtained with about one hundred and thirty parts, by weight, of a diluted caustic soda liquor containing, say, about three parts, by weight, of caustic soda. We then allow the mixture to stand at an ordinary temperature for about twelve hours, or until the separation of a blue precipitate is complete. The said precipitate is then collected on a filter and well washed with water, in order to eliminate therefrom free alkali or other soluble compounds. The insoluble blue residue constitutes the artificial indigo. It is used in the dye-bath in the same manner as the artificial indigo described in Patent 227,470, and it can be distinguished from the vegetable and the artificial indigo described in said Patent No. 227,470, by its pure blue color and by the absence in it of any coloring matter soluble in alcohol with a red or purple color.

Although caustic soda only was named in the hereinabove process, similar results can be obtained by the use of other suitable alkalies; but we prefer to employ a diluted solution of caustic soda, as before described. In a similar manner orthonitrobenzaldehyde can be converted into an artificial indigo by substituting aldehyde or pyroracemic (pyruvic) acid or analogous bodies for the acetone named in the aforesaid process; but we do not claim in this application for a patent the use of aldehyde or pyroracemic (pyruvic) acid or analogous bodies, such process forming the subject-matter of separate application for Letters Patent filed March 11, 1882.

What we claim as new, and desire to secure by Letters Patent, is—

The within-described process for producing artificial indigo from orthonitrobenzaldehyde by the action of acetone in the the presence of a diluted solution of an alkali, such as caustic soda, substantially as described.

In testimony whereof we have hereunto set our hands and seals in the presence of two subscribing witnesses.

ADOLF BAEYER. [L. S.]
  VIGGO BEUTNER DREWSEN. [L. S.]

Witnesses:
 ADOLPH SPIEGEL,
 LUDWIG LEHMANN.